May 10, 1955

J. E. TAYLOR 2,707,864

COMBAT DAMAGE CONTROL SYSTEM FOR GAS
TURBINE OR TURBO JET ENGINES

Filed Dec. 5, 1949

INVENTOR.
JOHN E. TAYLOR

BY Wade Loouty AND
Frederick W. Cotterman
ATTORNEYS

United States Patent Office 2,707,864
Patented May 10, 1955

2,707,864

COMBAT DAMAGE CONTROL SYSTEM FOR GAS TURBINE OR TURBOJET ENGINES

John E. Taylor, Dayton, Ohio

Application December 5, 1949, Serial No. 131,161

11 Claims. (Cl. 60—39.09)

(Granted under Title 35, U. S. Code (1952), sec. 266)

The invention described herein may be manufactured and used by or for the Government for governmental purposes without payment to me of any royalty thereon.

This invention relates to a combat damage control system for gas turbine and turbojet engines and is specifically directed to the isolating and neutralizing of one or more damaged burners from the remaining burners which are still functioning properly.

In the employment of gas turbines or turbojets in combat aircraft one or more of the combustion chambers generally called burners may be pierced by gunfire with the result that the burning gases escaping from the puncture increase the temperature around other parts of the structure to a dangerous degree.

To forestall the serious consequences of such a rise in temperature when such combat damage has been suffered the herein disclosed invention comprises means to sense that an abnormal rise in temperature has occurred together with automatic means responsive to the sensing means to simultaneously close the fuel valve, the air input valve, and valves in the pressure equalizing passageways which normally connect one combustion chamber to the next.

An object of the invention is to provide a device which will sense the above difficulties and apply the corrective measures with a minimum of mechanism in minimum time and at a minimum cost.

Other objects and advantages may become evident upon consideration of the following detailed description considered with reference to the drawings, wherein.

Like reference characters refer to like parts throughout the several views.

Figure 1:
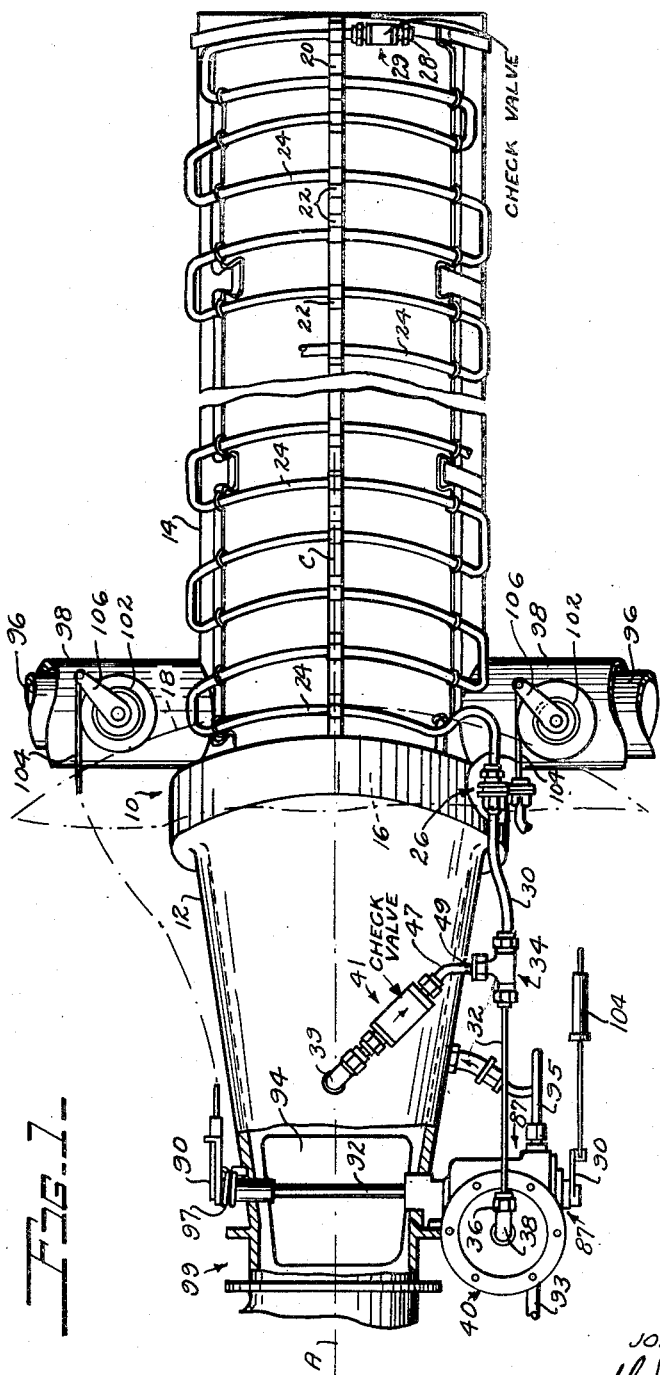
Fig. 1 is a top view of one of the series of combustion chambers or burners which compose the combustion unit of a jet propelled aircraft with the combat control mechanism, which is the subject of the present invention, installed thereon.
Figure 2:
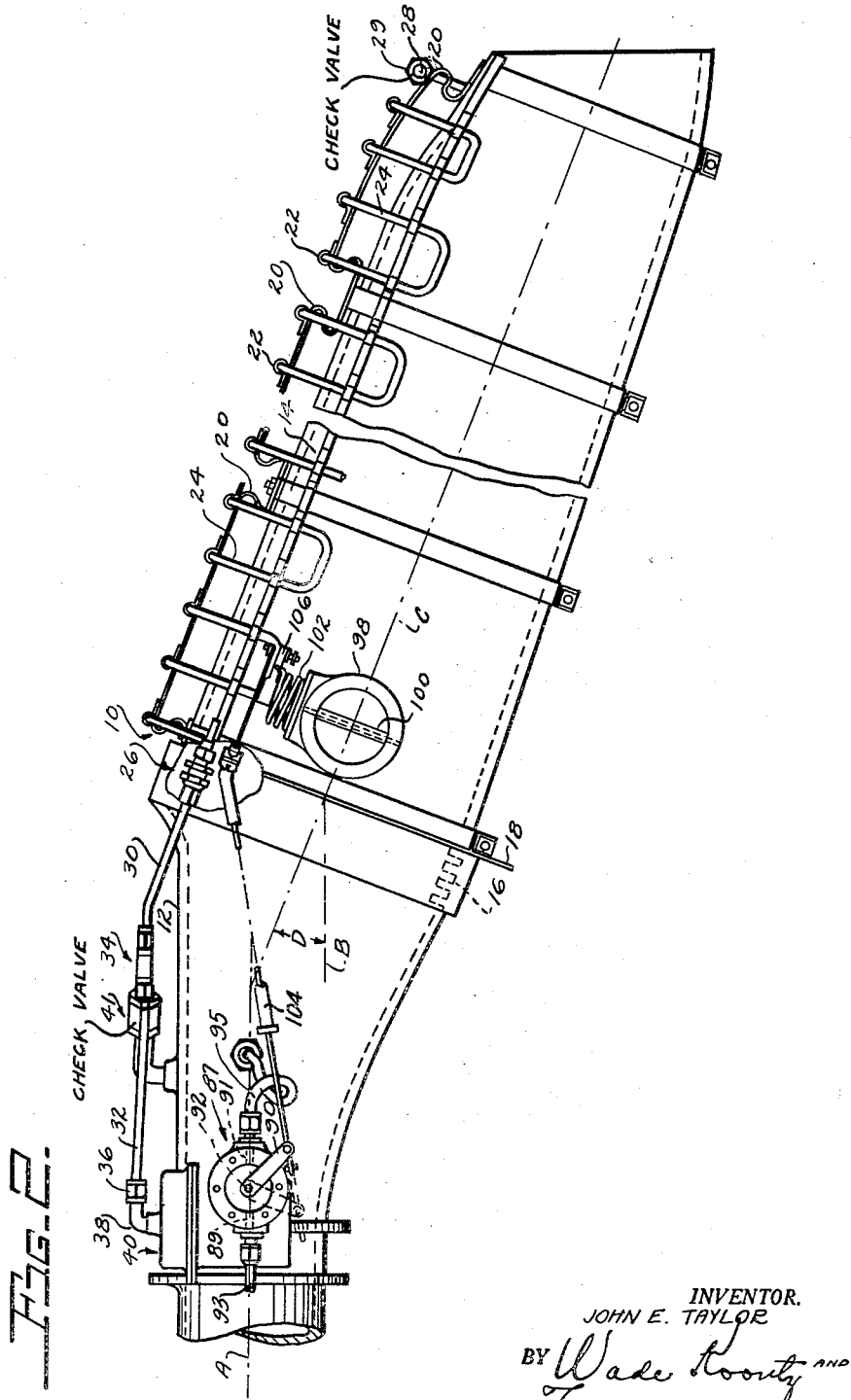
Fig. 2 is a side view of the burner shown in Fig. 1.

Reference is made more particularly to Figs. 1 and 2 which show one of the burners of a combustion unit, the burner being equipped with an embodiment of the herein disclosed invention. The burner housing 10 is made in two parts 12 and 14 screwed together at 16 with a supporting diaphragm 18 between the parts.

The axis A of the forward part 12 is substantially parallel with the line B which intersects the part 14 at its center line C, the center line C converging at an angle D with the line B.

Suitably spaced from the housing part 14 by bridges 20 and brackets 22 is a length of metal tubing 24 of low melting point such as lead-tin alloy or "Saran" tubing which extends transversely backward and forward in a somewhat serpentine fashion to the forward end of the housing part 14, where, for convenience in assembly, the tubing terminates in a tubing connector 26. A closure 28 is provided on the rear end of the tubing 24. A check valve 29 closes against fluid outflow.

Figure 3:
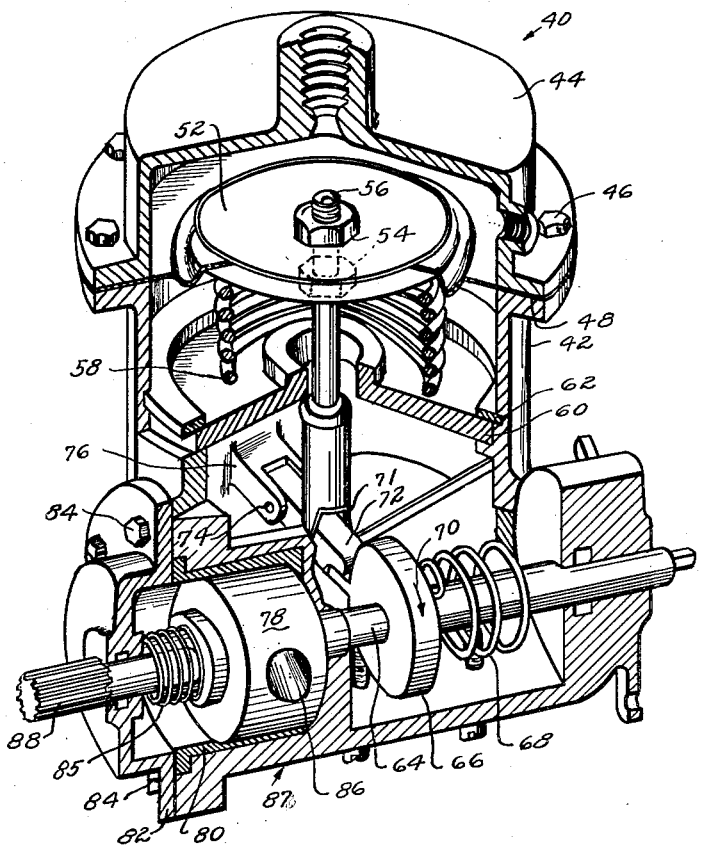
Fig. 3 is a perspective view of the control device by means of which the several shutoff valves which isolate a damaged burner are operated.

Shorter lengths of tubing 30 and 32 are joined by a T fitting 34, the tube 32 being joined by a connector 36 and elbow 38 into the top of a control unit 40 which is shown in detail in Fig. 3. A branch line connects the T fitting through a check valve 41 and elbow 39 into the top of the burner 12. The tubing 47 is restricted at 49 for a purpose to be hereinafter described.

The operative parts of the control unit 40 are contained in a housing 42. A cover 44 is attached to the housing 42 by screws 46. A flexible diaphragm 48 is clamped pressure tight between the housing and cover by the screws.

The central portion of the diaphragm 48 is clamped between discs 52 by nuts 54 on the threaded portion of an operating rod 56. Vertical adjustment of the diaphragm with respect to the rod 56 may be had by means of the nuts 54. An expansion coil spring 58 engages the underside of the lower disc 52 to urge the diaphragm upward, the lower end of the spring resting on a transverse partition 60 held in place by a spring ring 62.

Figure 4:
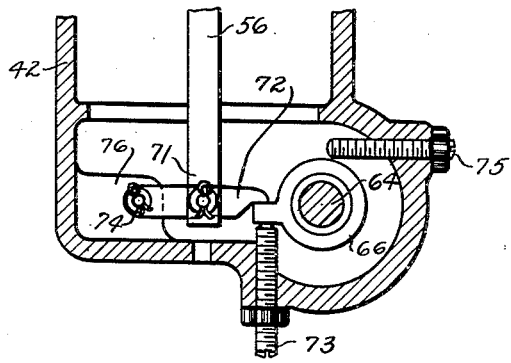
Fig. 4 is a broken-away cross section taken through some of the mechanism of the control unit Fig. 3.

A horizontal rock shaft 64 has a one-toothed ratchet 66 fixed thereon to rock therewith. A torsion spring 68 urges rotation of the ratchet 66 in the direction of the arrow 70. A pawl 72 (see Figs. 3 and 4) has its rear end hinged at 74 to a bracket 76 carried by the housing 42 and its front end in engagement with the single tooth of the ratchet 66.

The lower end of the operating rod 56 has a transverse opening 71 through which the pawl 72 extends. When the spring 58 raises the diaphragm 48, the operating rod 56 raises the pawl 72 and allows the one-toothed ratchet to rotate through ninety degrees, adjustable stop screws 73 and 75 being provided for engaging the ratchet tooth to delimit its rotative movement (see Fig. 4).

The fuel valve 87 is built into the control unit 40 and consists of a tapered plug 78 integral with the rock shaft 64 or fastened so as to rotate therewith. A sleeve 80 is interiorly bored to fit the tapered plug 78 and exteriorly machined to fit into a bore and counterbore in the housing 42. A cover 82 held on by screws 84 closes the space at the end of the plug 78 and houses the compression spring 85 which urges the plug into the taper bore to compensate for wear and avoid fuel leakage. When the valve 87 is open as shown in Fig. 3, the transverse opening 86 in the plug 78 is aligned with fuel inlet and fuel outlet passageways 89 and 91 (Fig. 2) in the housing 42. Tubing 93 and 95 connect the passageways 89 and 91 to the fuel supply and to the burner respectively. When the raising of the diaphragm 48 moves the pawl or trigger 72 away from the single tooth of the ratchet 66 and allows the ratchet to turn through ninety degrees, the opening 86 will be vertical and the fuel valve will be closed. The shaft 64 has bearing in the housing 42 and the cover 82. The forward end is multiple splined as at 88 to receive the internally splined hub of a valve operating lever 90 (see Figs. 1 and 2) and the rearward end is flattened for tongue and end groove connection with the shaft 92 of the air intake valve 99. A duplicate of the operating lever 90 is drivably connected to the outer end of the air intake valve shaft 92. A torsion spring 97 urges the shaft 92 to rotate clockwise as seen in Fig. 2.

The shaft 92 which carries the vane 94 of the air intake valve 99 is off center with respect to the vane, whereby, when the torsion springs 68 and 97 once start to rotate the connected shafts 64 and 92 which are drivably connected to the vane 94, the incoming air will automatically close the vane 94 against further air entry into the burner.

The pressure equalizing passageways 96 which normally extend one from each side of a burner for pressure connecting any one burner to those next adjacent, are each provided with a butterfly valve 98, the vane 100 of which is biased by a spring 102, away from the open position shown, to a closed position. Valves 98 are held open against the effort of springs 102 by "Bowden" wire linkages 104 which extend from the operating levers 90 to levers 106 which close the valves 98.

The operation of the device is substantially as follows:

When the engine is started, compressed air flows from the burner part 12 through the check valve 41 and restricted passageway 47 into the fusible tubing 24. Any small leaks by way of joints or other defects will be constantly replaced through the check valve 41. As long as the combined air leakage from the fusible tubing is not greater than may pass through the restricted passageway 47 all valves will remain open.

When, however, a larger pressure leakage from the fusible tubing occurs, as when either the tubing itself is severed by gunfire or is melted by heat resulting from a combat puncture in the burner, the pressure in the fusible tubing and in the space above the diaphragm 48 drops, the spring 58 raises the diaphragm 48 which withdraws the pawl 72 from the single tooth of the ratchet 66, whereby the several torsion springs 68, 97 and 102 start to close their respective valves 87, 99 and 98, and, as soon as the unbalanced vane 94 is turned slightly off the wide open position shown in Fig. 1, the force of the incoming air closes the air valve 99, thereby assisting in the closing of the fuel valve 87, and, through the "Bowden" wires 104 in the closing of the valves 98 in the equalizing passageways 96, thereby completely isolating the damaged burner from the remaining burners of the burner assembly.

If the system has stood idle for a considerable period of time or if it has not before been put into use, the tubing 24 may be initially pressurized by hand pump or other suitable means through the closure 28 and check valve 29. The shaft 64 having previously been turned against the tension of the tortion spring 68 to bring the ratchet tooth of the ratchet 66 against the stop screw 73 (Fig. 4) and held there until the pressure in the chamber between the cover 44 and the diaphragm 48 is sufficiently built up to hold the rod 56 depressed with the pawl 72 in its retaining position.

While throughout the foregoing specification I have indicated the use of tubing fusible in response to an overheated burner to isolate said burner, it will be understood that tubing of any material, which preferably overlies a considerable portion of that part of the burner which is exposed to gunfire, will give good results if provided with one or a number of spaced apart fusible plugs.

Any other means of releasing a fluid under pressure within a container in the combat exposed area in response to an overheated burner will be considered within the scope of the invention.

Having described my invention, I claim:

1. For isolating a combat damaged burner from the remaining burners of a jet engine, said burners each having an air-supply shut-off valve and equalizing passageways connecting each burner to the adjoining burners; an isolating apparatus comprising, in combination, a structure of fusible tubing overlying the combat exposed area of the burner and spaced a predetermined distance from the burner wall, one end of said tubing being closed and adapted to contain a fluid under pressure, a fuel supply shut-off valve, equalizing passageway shut-off valves, linkage connecting said fuel supply shut-off valve to said equalizing passageway shut-off valves for simultaneous operation, resilient means biasing said valves to closed position, a pressure sensitive control unit attached to the other end of said fusible tubing, a trigger associated with said control unit for holding said valves in the open position, and means associated with said control unit operative upon a predetermined reduction in pressure in said fusible tubing to operate said trigger and allow said resilient means to close said valves.

2. Apparatus for isolating a combat damaged burner from the remaining burners of a jet engine wherein said burners each have an air-supply shut-off valve, and two equalizing passageways connecting each burner to the adjoining burners, and wherein said isolating apparatus comprises, in combination, a structure of fusible tubing overlying the combat exposed area of the burner and spaced a predetermined distance from the burner wall, one end of said tubing being closed and adapted to contain a fluid under pressure, a fuel supply shut-off valve, and equalizing passageway shut-off valves, resilient means biasing said valves to closed position, a pressure sensitive control unit pressure connected to the other end of said fusible tubing, a trigger associated with said control unit for holding said valves in the open position, linkage connecting the air supply valve and the fuel supply valve to the equalizing passageway shut-off valves for simultaneous operation, and means associated with said control unit operative upon a predetermined reduction in pressure in said fusible tubing to operate said trigger and allow their resilient means to close all of said valves.

3. Apparatus for isolating a combat damaged burner from the remaining burners of a jet engine, said burners each having an air-supply shut-off valve, and equalizing passageways connecting each burner to the adjoining burners; said isolating apparatus comprising, in combination, a structure of fusible tubing overlying the combat exposed area of the burner and spaced a predetermined distance from the burner wall, one end of said tubing being closed and adapted to contain a fluid under pressure, the other end being connected into the burner to be pressurized thereby, a fuel supply shut-off valve, equalizing passageway shut-off valves, linkage connecting said fuel supply shut-off valve to said equalizing passageway shut-off valves for simultaneous operation, resilient means biasing said valves to closed position, a pressure sensitive control unit attached to the other end of said fusible tubing, a trigger associated with said control unit for holding said valves in the open position, and means associated with said control unit operative upon a predetermined reduction in pressure in said fusible tubing to operate said trigger and allow said resilient means to close said valves.

4. In a jet engine, means for isolating a combat damaged burner from the remaining burners, said burners each having equalizing passageways connecting one burner to the next, the improvement which comprises isolating apparatus consisting of a structure of fusible tubing overlying the combat exposed area of the burner and spaced a predetermined distance from the burner wall, one end of said tubing being closed and the other end connected into the pressure chamber of the burner, an air intake valve in the burner, a fuel supply shut-off valve, equalizing passageway shut-off valves, resilient means biasing said valves to closed position, a pressure sensitive control unit connected to said fusible tubing to receive pressure therefrom, a trigger associated with said control unit for holding said valves in the open position and means associated with said control unit operative upon a predetermined reduction in pressure in said fusible tubing to operate said trigger and allow said resilient means to close said air intake and said fuel intake valves, and linkage connecting said fuel intake and said air intake valves to said equalizing passageway shut-off valves whereby all of said valves close simultaneously.

5. In a jet engine burner, a rotatable air inlet valve, a rotatable fuel inlet valve, equalizing-passageway-shut-off valves, all of said valves being connected together to rotate in unison to the open or closed positions, spring means urging said valves to a closed position, a control unit which includes a trigger for holding said valves in the open position and a trigger releasing means operative by a drop in pressure in said control unit, a structure of fusible tubing overlying the combat exposed area of the burner and spaced a predetermined distance from the burner wall, said tubing being connected to the pressure sensitive trigger releasing means of the control unit and to the combustion chamber of the burner to thereby pressurize said tubing structure.

6. In a jet engine burner, a rotatable air inlet valve, a rotatable fuel inlet valve, equalizing-passageway-shut-off valves, all of said valves being connected together to rotate in unison to the open or closed positions, spring means urging said valves to a closed position, a control unit which includes a trigger for holding said valves in the open position and a trigger releasing means operative by a drop in pressure in said control unit, a structure of fusible tubing overlying the combat exposed area of the burner and spaced a predetermined distance from the burner wall, said tubing being connected to the pressure sensitive trigger releasing means of the control unit, and means to pressurize said tubing structure.

7. In a jet engine burner, a vane type air inlet valve pivoted off center with the larger area pointed toward the air coming into the burner when the valve is open, a rotatable fuel inlet valve, and equalizing-passageway-shut-off valves, all of said valves being connected together to rotate in unison to the open or closed positions, spring means urging said valves to a closed position, a control unit which includes a trigger for holding said valves in the open position and a trigger releasing means operative by a drop in pressure in said control unit, a structure of fusible tubing containing a fluid under pressure overlying the combat exposed area of the burner and spaced a predetermined distance from the burner wall, said tubing being connected to the pressure sensitive trigger releasing means of the control unit.

8. In a jet engine burner, a vane type air inlet valve pivoted off center with the larger area pointed upstream, a rotatable fuel inlet valve, equalizing-passageway-shut-off valves, all of said valves being connected together to move in unison to the open or closed positions, spring means urging said valves to a closed position, a control unit which includes a trigger for holding said valves in the open position and a trigger releasing means operative by a drop in pressure in said control unit, a structure of fusible tubing overlying the combat exposed area of the burner and spaced a predetermined distance from the burner wall, said tubing being connected to the pressure sensitive trigger releasing means of the control unit, and to the combustion chamber of the burner to thereby pressurize said tubing structure.

9. In a jet engine, an air inlet valve, a fuel inlet valve, equalizing passageway shut-off valves, all connected together to close in unison, resilient means biased to close said valves, a trigger for holding said valves open, a tripping device actuated by a drop in pressure to trip said trigger, and a superimposed structure of fusible tubing containing a fluid under pressure extending over the combat exposed area of the burner and operatively connected to said tripping device.

10. In a jet engine burner having an air inlet valve, a fuel inlet valve, and equalizing passageway shut-off valves; the combination of a pressurized container overlying the combat exposed area of the burner, at least a portion of said container being made of material fusible at a temperature escaping from a punctured burner, means for connecting said valves together to close in unison, resilient means urging said valves to the closed position, a trigger for holding said valves open, and a tripping device actuated by a drop in pressure in said container to trip said trigger.

11. In a jet engine burner having an air inlet valve, a fuel inlet valve, and equalizing passageway shut-off valves; a combat damage control mechanism which comprises, in combination, a container for a fluid under pressure overlying that portion of the burner which is exposed to combat, parts of said container being made of a material which is fusible at a temperature escaping from a punctured burner, means mechanically connecting said valves for closing in unison, resilient means for closing said valves, a trigger for holding said valves open, and a trigger releasing device actuated by a drop in pressure in said container.

References Cited in the file of this patent

UNITED STATES PATENTS 1,716,244   Sager _____ June 4, 1929